United States Patent [19]

Schildknecht

[11] 4,349,012
[45] Sep. 14, 1982

[54] SOLAR HEATING CONTROL

[75] Inventor: Richard J. Schildknecht, Madison, Wis.

[73] Assignee: Research Products Corporation, Madison, Wis.

[21] Appl. No.: 111,340

[22] Filed: Jan. 11, 1980

[51] Int. Cl.³ .............................................. F24J 3/02
[52] U.S. Cl. .................................... 126/422; 126/427
[58] Field of Search ............... 126/427, 422, 430, 429, 126/419

[56] References Cited

U.S. PATENT DOCUMENTS

| | | | |
|---|---|---|---|
| 4,060,195 | 11/1977 | Rapp | 126/427 |
| 4,109,639 | 8/1978 | Keegan | 126/422 |
| 4,203,424 | 5/1980 | Coxon | 126/422 |
| 4,231,352 | 11/1980 | Bowden | 126/427 |
| 4,257,395 | 3/1981 | Wieder | 126/422 |

Primary Examiner—Samuel Scott
Assistant Examiner—G. Anderson
Attorney, Agent, or Firm—Andrus, Sceales, Starke & Sawall

[57] ABSTRACT

A solar heating control is adapted to be interconnected to a pre-existing auxiliary heating system connected to operate in response to a command signal issued by a pre-existing thermostat. The control operates in response to a first temperature sensed within the solar heating system to directly conduct the command signal from the thermostat to the auxiliary heating system to provide an auxiliary heating sequence. The control responds to a second sensed temperature at the solar heating system to respond to the command signal to operate the solar heating system. The control may be selectively deactivated to permit exclusive operation of the auxiliary heating system by the thermostat when desired. The control selectively connects an alternate impedance to the thermostat for operation in a solar heating sequence to provide similar cyclic operation in both the solar and auxiliary heating sequences. The control provides electrical isolation for its operating circuits including logic circuits and provides transient protection. The control selectively operates in different modes under different sequences for specific seasons of the year for efficient operation. The control operates in response to abnormal temperature conditions to deactivate the solar control through circuitry operating independently from the logic control circuits.

3 Claims, 7 Drawing Figures

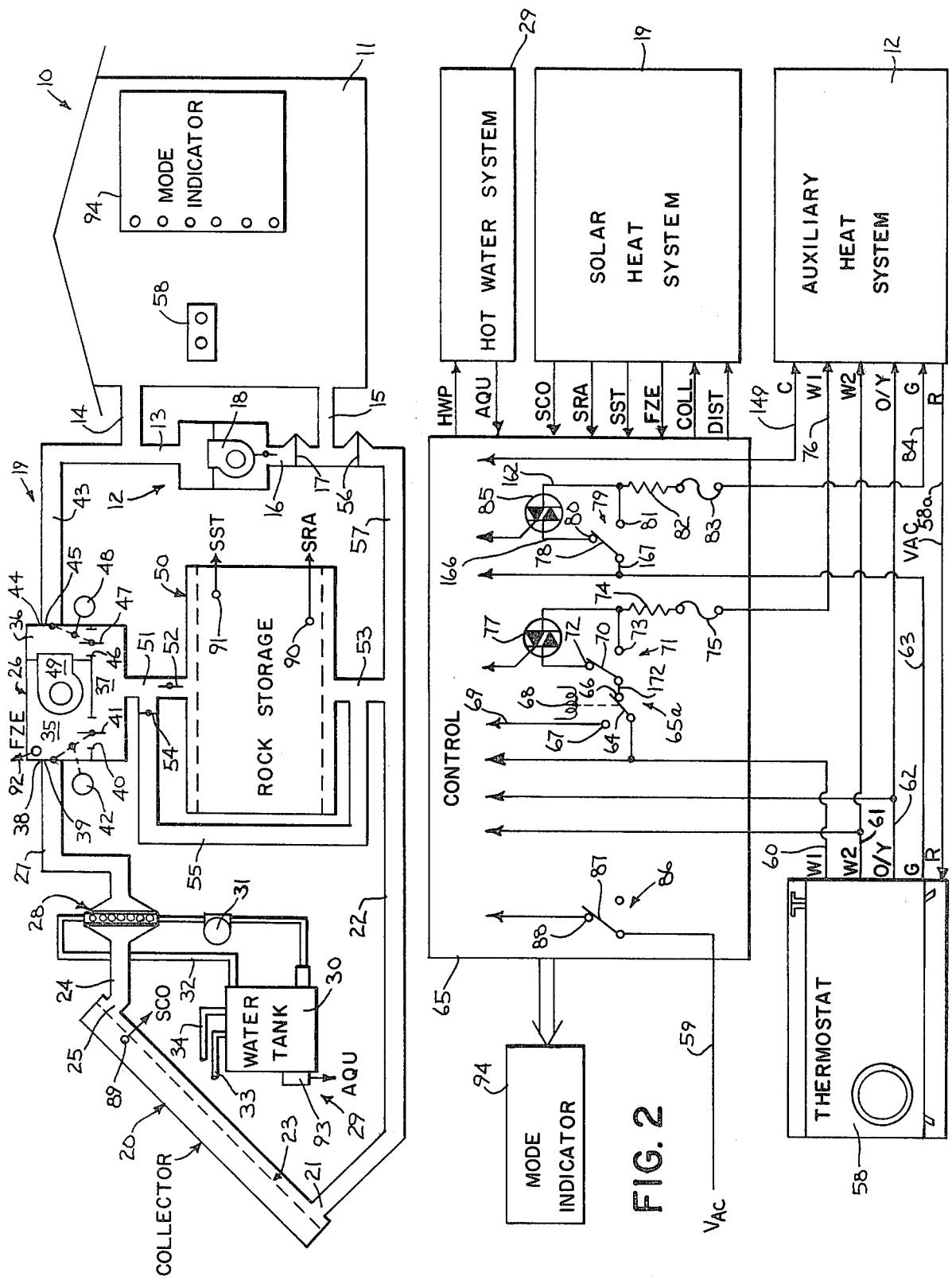

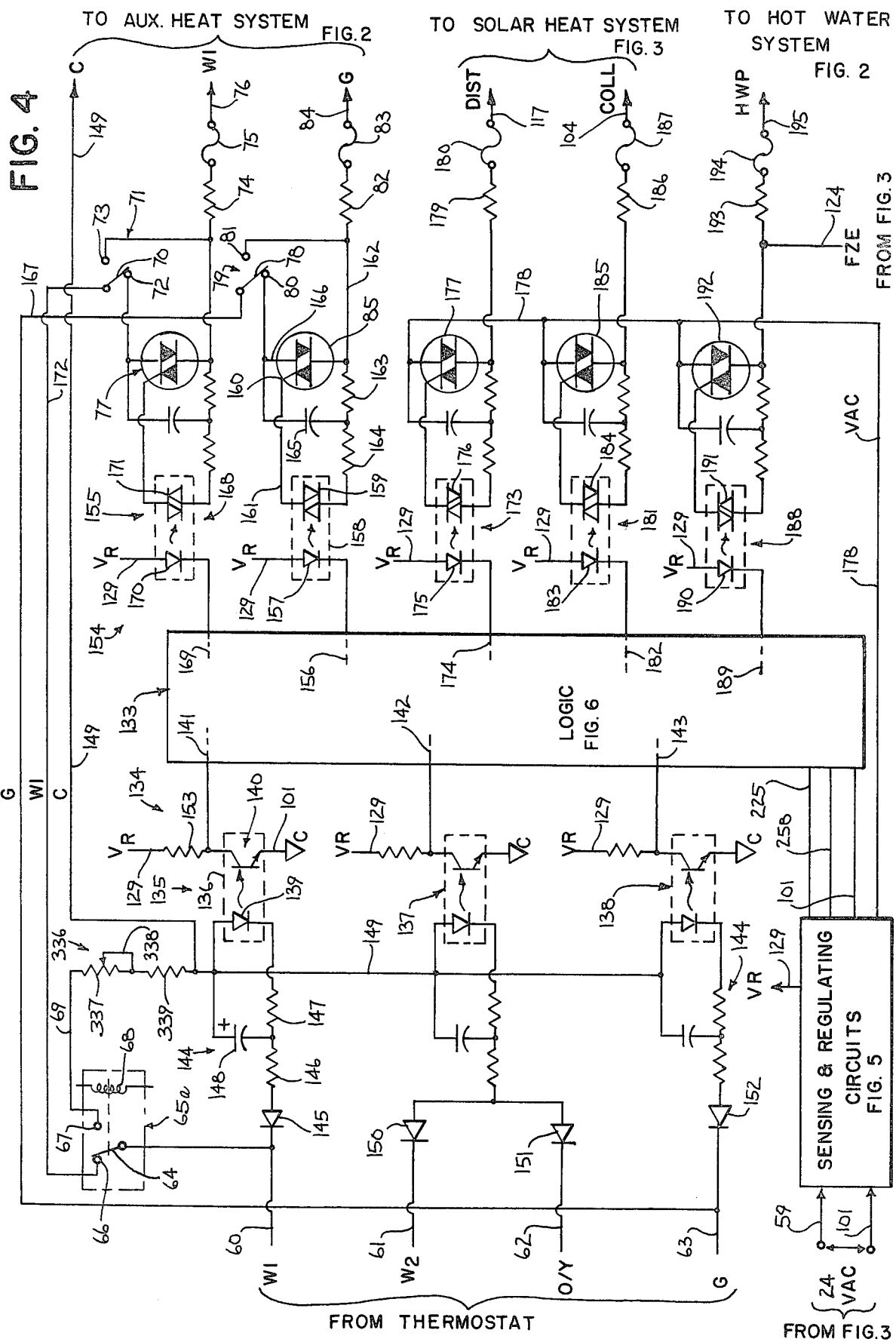

SOLAR HEATING CONTROL

BACKGROUND OF THE INVENTION

This invention relates to a control to selectively operate a heating system including a solar heating system.

Various controls have been employed to operate solar heating systems which selectively operate to transfer fluid from a collector to one or more areas to provide heat energy. Some systems directly supply fluid from a collector to an enclosure such as a home, building or other structure or, alternatively, conduct fluid from the collector to a storage area for retention for possible future use. Other systems conduct fluid from a collector to a transducer for heating water to provide a hot water supply for various uses. While some systems have operated independently to conduct fluid from a collector to an enclosure, from a collector to a storage area, from a collector to a hot water system or from a storage area to an enclosure, other systems have been commonly controlled to coordinate the fluid flow between such various components to provide a system operation.

A solar heating system is frequently added to a previously existent auxiliary heating system, such as a furnace or a heat pump for example, which have been connected to operate in response to an environmental sensor located at a particular area designed to receive heated fluid, such as within an enclosure for example. When such a solar heating system is interfaced with a pre-existent auxiliary heating system, extensive modifications of the existing heating system have been frequently required to permit interaction between the solar and auxiliary heating systems. In some cases, the existent environmental sensor is required to be replaced while, in other instances, two environmental sensors are required with one connected to operate the solar heating system and the other connected to operate the auxiliary heating system. In cases where a single environmental sensor is employed for commanding the operation of both the solar and auxiliary heating systems, an electrical control intervenes to intercept the command signal and in turn, generate a second signal or signals to control the auxiliary heating system and the solar heating system. Such construction has caused problems in the proper operation of an anticipator circuit provided within the environmental sensor which customarily operates to provide a range of cyclic operation in response to varying environmental conditions.

Some control systems have been extremely sensitive to external environmental transient conditions which may lead to spurious operations or might otherwise damage the control under severe externally generated conditions.

SUMMARY OF THE INVENTION

A control selectively operates both the solar heating system and the auxiliary heating system by permitting a command signal issued by the environmental sensor to be conducted directly to the auxiliary heating system in response to a first temperature condition of the solar heating system while further responding to the command signal to operate the solar heating system in response to a second temperature condition of the solar heating system.

The control is readily adapted to be interconnected to a pre-existing auxiliary heating system operatively connected to function with a pre-existing environmental sensor providing similar or matched impedance for precise operating control. The control can be readily interconnected with an existent directly interconnected system with only minimal connection requirements.

The control may be conveniently operated to entirely remove the solar heating system from operating in response to the command signal in cases where it is desired to only operate under the auxiliary heating system.

The control further provides an alternate impedance which is selectively connected in response to the operation of the solar heating system to provide a substantially similar operation of the anticipator circuit provided by the environmental sensor for operation under either the auxiliary heating system or the solar heating system.

The control provides substantial electrical isolation from power operating equipment to protect its operating circuits and particularly its logic circuits from external damage or from spurious operations from external influences. The control provides particular protection to its circuits due to externally induced transient conditions.

The system may be selectively operated to operate under different modes of operation under different operating conditions which may correspond to specific seasons of the year for efficient operation. In such manner, a solar heating operation may be performed even in warm weather or summertime while removing the energy storage sequences. The system may also selectively operate at preset temperature conditions rather than at variable differential temperature ranges for controlling the operation of the solar heating system which may be particularly desirable during warm weather operation. The system further operates in response to abnormal temperature conditions to deactivate the solar control system through circuitry operating independently from the logic control circuits to permit such logic circuits to control the auxiliary heating system.

The invention provides numerous unique constructions and sequences of operation which ensure reliable operation to provide numerous operating modes under various sensed operating conditions as more fully described hereinafter.

BRIEF DESCRIPTION OF THE DRAWINGS

The drawings furnished herewith illustrate a preferred construction of the invention in which the above advantages and features are clearly disclosed, as well as others which will be clear from the following description.

In the drawings:

FIG. 1 is a diagrammatic block illustration of a system for controlling the environment in an enclosure and including a sun responsive energy convertor;

FIG. 2 is a diagrammatic block and circuit schematic illustration showing the interconnection of an electrical control to various elements of the environmental control system of FIG. 1;

FIG. 4 is an electrical circuit schematic illustrating a portion of the control employed in the system of FIGS. 1 and 2;

DESCRIPTION OF THE PREFERRED ILLUSTRATED EMBODIMENT

Figures 3, 7:
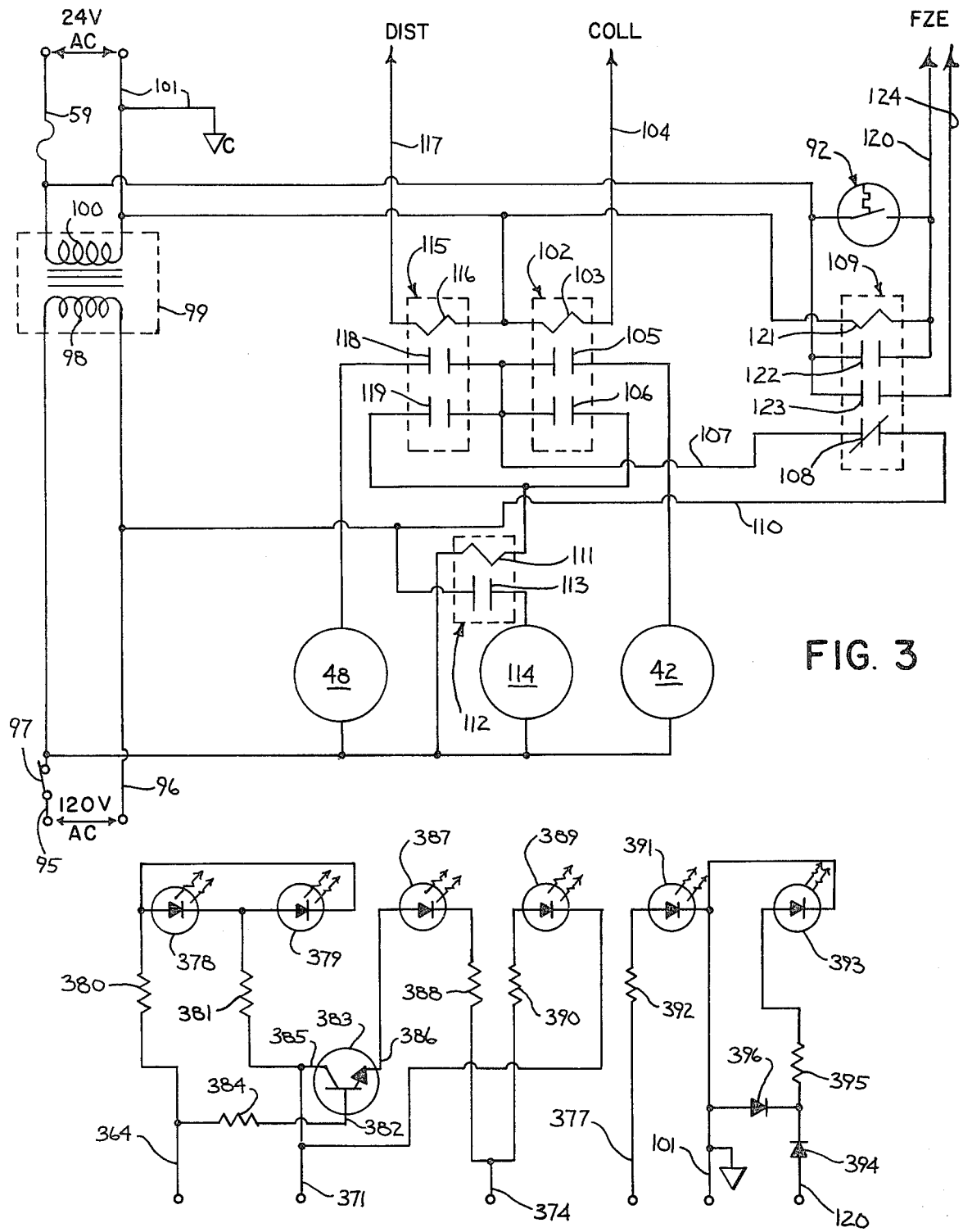
FIG. 3 is an electrical circuit schematic showing a portion of the electrical control connected to several elements of the environmental system of FIGS. 1 and 2.
FIG. 7 is an electrical circuit schematic illustrating the signaling and mode indicating circuits.

Referring to the drawings and particularly FIG. 1, a controlled environmental system 10 includes an enclosed area such as within a house 11 or other suitable enclosure in which the environment is to be controlled. An auxiliary heat system 12 may constitute a conventional system found in existing homes for selectively supplying either heated or cooled fluid. In such a system, heated or cooled fluid is selectively supplied through an output conduit 13 and a connecting conduit 14 to the enclosure 11 while return fluid is permitted to flow through a connecting conduit 15 and an input conduit 16 through a fluid pressure operated damper 17. A power source 18, such as a pump, blower or the like, may be used if necessary to circulate the heated or cooled fluid to and from the enclosed structure 11. The auxiliary heat system 12 could conceivably constitute a reversible heat pump which may be selectively operated in the winter time to provide heat to the enclosure 11 or operated during the summer time to provide cooling fluid. Frequently, standard air conditioning units are employed to operate separately from the heat generating unit, which may constitute a gas fed or oil fed furnace for example, to conduct either heated or cooled air through common or separate connecting conduits.

A solar converting and storage unit 19, hereafter referred to as the solar system 19, includes a solar collector 20 which functions to convert radiant sun energy into heat energy for use in the system. For example, lower temperature fluid may be supplied to collector 20 through an inlet conduit 21 from a connecting conduit 22. Such fluid is conducted to a heat exchanging area such as at 23 where it is heated before being supplied to a connecting conduit 24 through an outlet conduit 25.

The heated fluid in connecting conduit 24 is conducted to a fluid handling unit 26 through a connecting conduit 27 and a heat exchanger 28. The exchanger 28 is connected within a hot water generating, storage and distribution system 29 wherein lower temperature liquid in a lower portion of a water tank 30 is conducted to the heat exchanger 28 by a water pump 31. The heat exchanger 28 circulates such lower temperature water in close proximity to the heated fluid supplied from collector 20 to thereby increase the temperature of the water before it is supplied through a connecting conduit 32 to the water tank 30. A hot water output conduit 33 and a fresh water supply conduit 34 are connected to the water tank 30 and function to provide a continuous supply of hot water to the enclosure 11 or wherever needed.

The fluid handling unit 26 includes three chambers 35, 36, and 37. The chamber 35 communicates with the connecting conduit 27 through an inlet conduit 38 containing a control damper 39. The damper 39 is selectively operable between a normally closed position as illustrated in FIG. 1 and a fully open position to permit fluid flow from conduit 27 to chamber 35. The chamber 35 communicates with chamber 37 through a passage 40 which contains a normally open control damper 41 which is selectively operable between the normally open position to permit fluid passage from chamber 37 to chamber 35 and a fully closed position. The dampers 39 and 41 are coupled to simultaneously operate in response to the operation of a collector damper motor 42. When motor 42 is de-energized, damper 39 remains in its normally closed position while damper 41 remains in its normally open position. When energized, motor 42 operates to open damper 39 and to close damper 41.

The chamber 36 communicates with a connecting conduit 43 through a passage 44 which contains a normally closed control damper 45. The chamber 36 also communicates with the chamber 37 through a passage 46 which contains a normally open damper 47. The dampers 45 and 47 are interconnected to simultaneously operate in response to the operation of a distribution damper motor 48. When motor 48 is deenergized, the damper 45 remains in its normally closed position while damper 47 remains in its normally open position. When energized, motor 48 operates to close damper 47 and open damper 45. A pressure unit 49 such as a fluid pump or blower operates when energized to conduct fluid from chamber 35 to chamber 36 and to provide pressure upon the fluid within chamber 36.

The chamber 37 of fluid handling unit 26 is connected to an energy storage 50 through a connecting conduit 51 containing a normally open damper 52. The storage 50 also communicates with conduit 22 through a connecting conduit 53. In one sequence of operation, a closed loop fluid collecting sequence may be established so that heated fluid supplied by collector 20 is circulated through the heat exchanger 28, chamber 35, chamber 36, chamber 37, storage unit 50 and thereafter returned to collector 20 through conduit 22. In such sequence, the fluid is transferred by the pressure unit 49 so that the heat generated by collector 20 is transferred and stored in the storage unit 50 for possible future use. In situations where storage 50 is not needed or desired, the damper 52 may be manually operated to a closed position while a damper 54 may be manually operated to an open position to permit fluid to flow through a bypass conduit 55.

In another collecting sequence of operation, the heated fluid generated by collector 20 is supplied to the enclosure 11 through a closed loop including conduit 27, chamber 35, chamber 36, conduit 43, conduit 14, and into enclosure 11 while returning through conduit 15, a pressure operated damper 56, a return conduit 57, and connecting conduit 22 to be returned to the collector 20. Again, unit 49 operates to supply pressure to the fluid to provide the necessary circulation through the closed loop.

In another sequence of operation, fluid may flow from storage 50 through conduit 51, chamber 37, chamber 35, chamber 36, conduit 43, conduit 14 and into the enclosure 11, while returning through conduit 15, damper 56, conduit 57 and conduit 53 to be returned to the storage 50. Again, the unit 49 provides pressure to the fluid to provide closed loop circulation.

A wide variety of environmental controls within sun energy conversion systems employing collectors and storage units are widely known and the construction illustrated in FIG. 1 has been provided by way of illustration only to show one system in which the invention herein may operate. It is to be understood that the invention may be used to operate any one of a number of various solar systems and the invention is not to be limited to the particular fluid conducting system illustrated in FIG. 1.

An environmental responsive monitor 58 may take the form of a conventional thermostat which may be placed in the enclosure 11 and selectively preset for controlling and regulating the operation of the environmental control system 10.

With reference to FIG. 2, energizing power is supplied from the auxiliary heat system 12 through an input circuit 58a to the thermostat 58, and may constitute a power source of twenty four volts AC, for example. The thermostat 58 responds to the surrounding environment and provides a first stage heat signal W1 at an output circuit 60 whenever the temperature within enclosure 11 decreases to a first magnitude relative to a preset value. A second stage heat signal W2 is provided at an output circuit 61 whenever the temperature within the enclosure 11 decreases to a second magnitude less than the first magnitude relative to the preset value. An air conditioning signal O/Y is provided at an output circuit 62 when the temperature within enclosure 11 increases to a third magnitude greater than the preset value. A fan operating command signal G is provided at an output circuit 63 either in response to any one of the signals W1, W2 or O/Y or by manual actuation at the thermostat 58. In some environmental sensing units, the air conditioning signal O/Y is deactivated or locked out during the winter season while the first stage and second stage heat signals W1 and W2 are deactivated or locked out during the summer time. In other systems, all of the signals are continuously automatic or may be selectively manually actuated. Here again, the invention may be employed with any conventional sensing and control unit 58 which may comprise a conventional thermostat. For example, the thermostat 58 may comprise mercury switches which are temperature actuated to close a circuit thereby connecting a suitable output circuit to the twenty four volt A.C. signal at input 58a thereby providing an appropriate signal.

The first stage heat signal W1 at output 60 is connected to a switch arm 64 of a relay controlled switch 65a which normally engages a contact 66 but may be energized to engage a contact 67 in response to the operation of a relay coil 68. The contact 67 is connected to a circuit 69 provided by control 65 while contact 66 is connected to a switch arm 70 of a manually controlled switch 71 which is operable between a contact 72 for automatic solar operation and a contact 73 for disabling the solar system. The contact 73 is connected to the auxiliary heat system 12 through a resistor 74, a fuse 75 and a connecting circuit 76. The contact 72 is connected to the auxiliary heat system 12 through a triac 77 and the resistor 74, fuse 75, and connecting circuit 76.

The stage heat signal W2 at output 61 is connected to the control 65 and to the auxiliary heat system 12. The air conditioning signal O/Y at output 62 is connected to the control 65 and to the auxiliary heat system 12.

The fan signal G at output 63 is connected to a switch arm 78 of a manually operated switch 79 which is operable between a contact 80 for automatic solar operation and a contact 81 for disabling the solar system. The contact 81 is connected to the auxiliary heat system 12 through a resistor 82, a fuse 83 and a connecting circuit 84. The contact 80 is connected to the auxiliary heat system through a triac 85, the resistor 82, fuse 83 and the connecting circuit 84.

A manually operable switch 86 provides a switch arm 87 which selectively engages a contact 88 to provide power to the control 65 or may be open circuited to disconnect power from the control 65.

The switch arm 87 of switch 86, the switch arm 70 of switch 71 and the switch arm 78 of switch 79 are interconnected for simultaneous manual operation. Thus, the three switches may be manually placed in the position as illustrated in FIG. 2 for automatic solar operation as directed by the control 65. In such position, operative power is supplied to the control through contact 88 and the triacs 77 and 85 are connected in circuit for controlling the auxiliary heat system 12. Alternatively, the three switches 86, 71 and 79 may be transferred to operatively disable control 65 thereby de-activating the solar heat system to provide direct control of the auxiliary heat system 12 by the thermostat 58 through contact 73 of switch 71 and contact 81 of switch 79.

As illustrated in FIG. 2, the control 65 may be easily connected to a pre-existing auxiliary heat system 12 which had previously been exclusively controlled by the thermostat 58. For example, only the first stage heat output circuit 60 and the fan output circuit 63 are required to be separated for the insertion of the aforesaid switches, triacs, resistors and fuses while the second stage heat output circuit 61 and the air conditioning output circuit 62 only need to be monitored either through a tap or possibly electromagnetically.

Furthermore, the command signals produced by thermostat 58 are supplied to the auxiliary heat system 12 under either automatic solar control or direct control. In other words, the control 65 does not have to generate secondary control signals to operate the auxiliary heat system 12.

A series of sensors are employed within the solar system 19 and hot water system 29 to provide operational control for an automatic solar mode of operation. For example, a sensor 89 is located within, at or near the collector 20 to monitor the operating condition of such collector. For example, sensor 89 may comprise a temperature responsive thermistor which is located within or adjacent to a fluid conducting conduit for providing a signal SCO which is proportional to the fluid temperature at or near the sensor location.

A sensor 90 is located at or near the bottom of the storage 50. For example, the sensor 90 may comprise a temperature responsive thermistor which is located within, at or near the bottom of storage 50 for providing an output signal SRA proportional to the fluid temperature at or near the sensor location.

A sensor 91 is located within, at or near the storage 50. For example, the sensor 91 may comprise a temperature responsive thermistor which is located in the upper portion of storage 50. The sensor 91 provides a signal SST which is proportional to the temperature of the fluid at or near sensor 91.

A sensor 92 is connected within, at or near the chamber 35 of the fluid handling unit 26. For example, the sensor 92 may comprise a bi-metal thermal switch which is preset to operate in response to a predetermined temperature such as might indicate a frozen condition within the conduits or coils within the transducer 28. When sensing a predetermined temperature, the sensor 92 operates to supply a freeze signal FZE to indicate an abnormal condition.

A sensor 93 is located within, at or near the water tank 30 and monitors the condition of fluid therein. For example, the sensor 93 may constitute a bi-metal thermal switch which is operated when sensing a predetermined fluid temperature within tank 30 to provide a signal AQU indicating a need for heated water.

The control 65 is also connected to a mode indicator 94 which may, if desired, be located at or near the thermostat 58 within the enclosure 11.

The control 65 responds to various inputs, as hereinafter more fully described, to selectively provide a collection signal COLL indicating that significant heat energy exists in collector 20 and to selectively provide a distribution signal DIST indicating, among other things, a need for heat energy in the enclosure 11. Further, the control 65 responds to various inputs to selectively provide a hot water pump signal HWP to operate pump 31 in the hot water system 29.

With reference to FIG. 3, a pair of input leads 95 and 96 are connected to a suitable commercially available power source, such as frequently found in residential areas (120 volts A.C. for example). The lead 95 is connected to the return lead 96 through an overload protector switch 97, such as a fuse or a resettable circuit breaker, and a primary winding 98 of a power transformer 99. The transformer 99 provides a secondary winding 100 connected to the power lead 59 and a return circuit lead 101. The power circuit lead 101 forms a neutral or common for the internal circuits of control 65.

A collection relay 102 includes a coil 103 connected to the system neutral 101 and to a connecting circuit 104 for responding to the collection signal COLL supplied from control 65. When energized in response to the collection signal COLL, the relay 102 operates to close its first set of contacts 105 and its second set of contacts 106. The closure of contacts 105 completes an operating circuit from the power source lead 95 through the overload switch 97, the collection damper motor 42, the contacts 105, a return circuit 107, a set of normally closed contacts 108 of a freeze protection relay 109, and a return circuit 110 to the lead 96. The damper motor 42, when energized, operates to open damper 39 and close damper 41 to allow heated fluid from collector 20 to be transferred to either the enclosure 11 or to the storage 50.

The closure of contacts 106 completes an energizing circuit to a coil 111 of a motor contactor relay 112 through a circuit including the power source lead 95, overload switch 47, coil 111, closed contacts 106, return circuit 107, normally closed contacts 108, and the return circuit 110 to the lead 96. Relay 112, when energized, closes its normally open contacts 113 to provide an energizing circuit for a motor 114 which operates the blower 49 within the distribution control 26. The blower motor 114 is energized through a circuit including the power source lead 95, overload switch 97, the motor 114, closed contacts 113 and return circuit 96.

A distribution relay 115 includes a coil 116 connected to the system neutral 101 and to a connecting circuit 117 for responding to the distribution signal DIST supplied from control 65. When energized in response to the distribution signal DIST, the relay 115 closes it associated first and second sets of contacts 118 and 119. The closure of contacts 118 completes an energizing circuit from the power source lead 95 through the overload switch 97, the distribution damper motor 48, closed contacts 118, the return circuit 107, normally closed contacts 108 and the return circuit 110 to the lead 96. The energization of the distribution damper motor 48 functions to open damper 45 and close damper 47 to permit the passage of fluid to the enclosure 11 from either the collector 20 or the storage 50. The closure of contacts 119 completes an energizing circuit to the coil 111 of relay 112 which functions as previously described to energize the motor 114 associated with blower 49.

When sensing an abnormally low temperature condition at or near the heat exchanger 28, the freeze sensor 92 operates to close its contacts thereby completing an electrical circuit from the transformer 99 the sensor 92 to an output lead 120 for providing a freeze signal FZE to the mode indicator 94. The closed contacts of the freeze sensor 92 also provides an energizing circuit to the freeze protection relay 109. The freeze protection relay 109, when energized, closes associated first and second sets of contacts 122 and 123 and opens its normally closed contacts 108. The closure of contacts 122 provides a latching circuit to maintain relay 121 energized irrespective of the condition of freeze sensor 92 while also maintaining the freeze signal FZE at lead 120. The closure of contacts 123 provides the freeze signal FZE at a connecting circuit 124 for use by control 65 to operate the pump 31 within the hot water system 29.

The opening of normally closed contacts 108 in response to a sensed freeze condition immediately disables the damper motors 42 and 48 and the motor 114 for blower 49. Thus when an abnormal low temperature condition exists in transducer 28, the collection and distribution sequences are disabled while the control 65 operates to energize the hot water pump 31 to maintain water circulation through transducer 28 to alleviate the freezing condition. After the sensed freezing condition subsides and the sensor 92 opens its contacts, the overload switch 97 must be opened to de-energize relay 109 and thereafter reclosed to resume normal operation.

Figure 5:
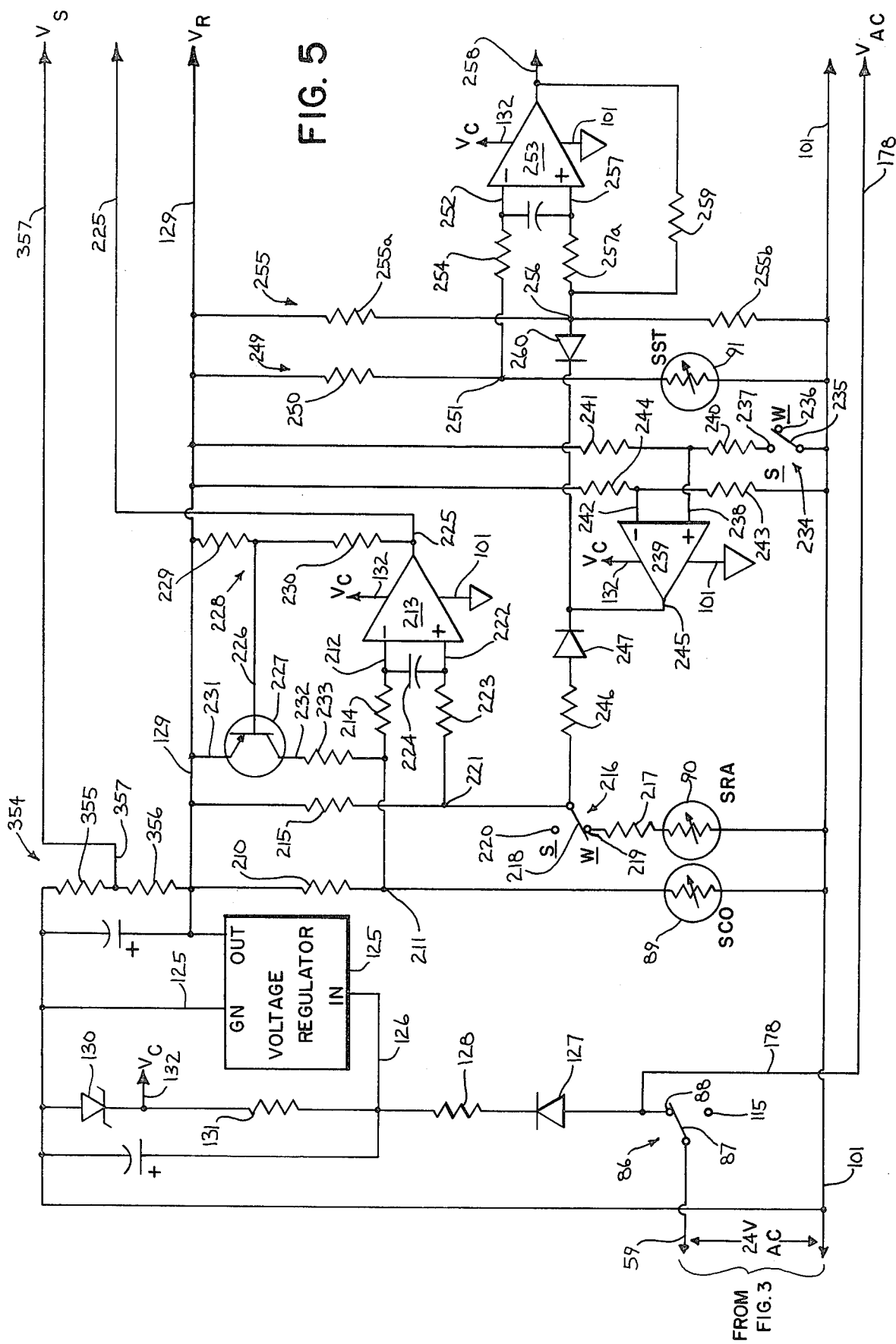
FIG. 5 is an electrical circuit schematic illustrating the sensing and regulating circuits depicted in FIG. 4.

A power regulating circuit is shown in FIG. 5. Specifically, a voltage regulator 125 includes an input circuit 126 connected to the power source lead 59 through the switch arm 87, contact 88, a diode 127 and a resistor 128. A grounding terminal of the regulator 125 is connected to the system neutral 101 while an output circuit 129 provides a highly regulated D.C. voltage $V_R$, such as 12 volts D.C. for example. A Zener diode 130 and a resistor 131 are connected across the input circuit 126 and the system neutral 101 and provides an output 132 providing a D.C. reference voltage $V_C$ which is suitable for providing operating power to certain components, such as voltage comparators or the like. Capacitors may also be employed in the regulating circuit for stability.

With reference to FIG. 4, the circuits 60, 61, 62 and 63 from the thermostat 58 are connected to control logic 133 through an input circuit 134 including optical coupling circuits 135 which provide electrical isolation to the logic circuits 133. The optical circuits 135 include three photo transistor opto-isolators 136, 137 and 138, which may be selected from any one of a number of commercially available components, such as provided by Motorola under the designation 4N28. In any event, the opto-isolators 136, 137 and 138 each include a light emitting diode 139 (hereafter LED) which, when activated, renders a light-responsive NPN type transistor circuit 140 conductive. Each transistor circuit 140 includes an emitter circuit connected to the system common 101 and a collector circuit connected to provide an output to the logic circuits 133. For example, the opto-isolator 136 provides an output at a circuit 141. The opto-isolator 137 provides an output at a circuit 142. Likewise, the opto-isolator 138 provides an output at a circuit 143.

Each of the opto-isolators has its associated light emitting diode 139 connected to at least one of the circuits 60, 61, 62 and 63 through a rectifying and filtering circuit 144. For example, the LED 139 of opto-isolator 136 is connected to the input circuit 60 through a rectifying diode 145 and a filtering circuit including serially connected resistors 146 and 147 and parallel connected capacitor 148, the latter connected across resistor 147 and LED 139. The capacitor 148 and LED 139 are connected to a ground or neutral circuit 149 which is connected to the auxiliary heat system 12 (see FIG. 2). The opto-isolator 137 is coupled to both of the input circuits 61 and 62 through a pair of rectifying diodes 150 and 151, respectively, connected to operate as an OR logic gate. The opto-isolator 138 is coupled to the input 63 through a rectifying diode 152.

The collector circuits for each of the photo-transistors is connected to the regulated reference lead 129 through an associated resistor 153. In such manner, a high voltage is maintained at the collector circuit when the opto-isolator is de-energized while a low voltage is maintained at the collector circuit when the opto-isolator is energized.

In operation, the thermostat 58 responds to a first stage heat condition to operatively close a switch and connect alternating current power from the circuit 58a to input 60 constituting a first stage heat signal W1. The diode 145 conducts during alternate half cycles to provide energizing power to the LED 139 which activates the photo-transistor 140. When photo-transistor 140 turns on in response to a W1 signal, the output at 141 drops from the high voltage level, hereafter referred to as logic "1", to the low voltage level, hereafter referred to as logic "0", due to the operative connection of the collector circuit 141 to the system neutral or common 101. The capacitor 148 maintains a charge during alternate half cycles to maintain the LED 139 energized and provide a continuous logic "1" signal at output 141 in response to the first stage heat signal W1 appearing at input 60.

In like manner, the occurrence of either a second stage heat signal W2 at input 61 or an air conditioning signal O/Y at input 62 will energize the opto-isolator 137 to transfer the output at collector 142 from a logic "1" signal to a logic "0" signal. A fan signal G appearing at input 63 will energize the opto-isolator 138 to transfer the output at collector 143 from a logic "1" signal to a logic "0" signal.

The logic circuit 133 is connected to the auxiliary heat system 12, the solar heat system 19 and the hot water system 29 through an output coupling circuit 154 including opto-isolating circuits 155. Each of the opto-isolating circuits 155 are substantially identically constructed and only one need be described in detail to provide an understanding of their construction and operation. For example, a logic "0" or low level voltage signal appearing at a logic output circuit 156 will energize a LED 157 of an opto-coupling circuit 158, which may be selected from any commerically available source such as provided by Motorola under the designation MOC 3011. The opto-isolating circuit 158 includes a photo-transistor 159 operating as a triac which, in turn, is connected to a gate circuit 160 of the triac 85 through a connecting circuit 161. One power circuit 162 of triac 85 is connected to the photo-transistor 159 through resistors 163 and 164 while a coupling capacitor 165 is connected to the juncture of resistors 163 and 164 and to another power circuit 166 of triac 85. The output circuit 162 of triac 85 is connected to the output circuit 84 through the resistor 82 and fuse 83.

When triac 85 is energized in response to a logic "0" signal appearing at the logic output circuit 156, a command circuit is completed from input circuit 63, a connecting circuit 167, the switch arm 78 of switch 79, contact 80, input circuit 166, triac 85, output circuit 162, resistor 82, fuse 83 and output circuit 84 to provide the fan signal G to the auxiliary heat system 12.

In a similar manner, an opto-isolator 168 operates in response to a logic "0" signal at a logic output circuit 169 to energize LED 170 and render the photo-transistor 171 conductive. The triac 77 thereby turns on to complete an energizing circuit to the auxiliary heat system 12 through the circuit 76. Specifically, a logic "0" signal at output 169 will render the triac 77 conductive to provide a command circuit from input circuit 60 through switch arm 64 of switch 65a, contact 66, a connecting circuit 172, the switch arm 70, contact 72, triac 77, resistor 74, fuse 75 and output the circuit 76 to supply a first stage heat signal W1 to the auxiliary heat system 12.

An opto-isolator 173 responds to a logic "0" signal at a logic output circuit 174 to energize an LED 175. An associated photo-transistor 176 thereby conducts to gate a triac 177 into conduction. In such manner, a conducting circuit is provided from a voltage reference circuit 178 (from FIG. 5) through the conducting triac 177, a resistor 179 and a fuse 180 to the output circuit 117 to provide a distribution signal DIST to the control in FIG. 3 for operating the solar heat system 19.

An opto-isolator 181 responds to a logic "0" signal at a logic output circuit 182 to render an LED 183 conductive. A photo-transistor 184 is rendered conductive to gate a triac 185 into conduction. In such manner, a conducting circuit is provided from the voltage reference circuit 178 through the conducting triac 185, a resistor 186 and a fuse 187 to the output circuit 104 to provide a collection signal COLL to the control in FIG. 3 for operating the solar heat system 19.

An opto-isolator 188 responds to a logic "0" signal at a logic output circuit 189 to render an LED 190 conductive. A photo-transistor 191 conducts a gate a triac 192 into conduction. In such manner, a conducting circuit is provided from the voltage reference circuit 178 through the conducting triac 192, a resistor 193 and a fuse 194 to provide a hot water pump signal HWP at an output circuit 195 which is connected to operate the pump 31 in the hot water system 29.

The opto-isolating input circuits 136, 137 and 138 and the opto-isolating output circuits 158, 168, 173, 181 and 188 provide electrical isolation to the logic circuits 133 for accurate control independent of externally generated noise or other transient signals such as might be provided by the power operating circuitry of the thermostat 58, the hot water system 29, the solar heat system 19, the auxiliary heat system 12, or any other source external to the logic circuits 133. Such isolation is extremely desirable to isolate the power transformer 99 operating within the solar heating system from the power transformer which conventionally operates within the auxiliary heating system to supply power to operate a heat pump or furnace therein. Such isolation provided by the opto-isolating circuits thus eliminates the necessity of obtaining a corresponding electrical phase relationship between the two transformers. The opto-isolating circuits thus provide extremely accurate control which is substantially immune to external noise.

The output of control 65 to the auxiliary heat system 12 and the solar heat system 19 permits reliable operation over a variety of conditions while protecting the switching and logic circuits from damage due to extraneous transients or the like. For example, the limiting resistors 74 and 82 limit current transients. Further, the triacs 77 and 85 are generally capable of withstanding one operating alternating current cycle of a current transient to permit the fuses 75 and 83 sufficient time to open-circuit the output and protect the triacs, the opto-isolators and logic circuitry. In similar manner, the limiting resistors 179, 186 and 193, the fuses 180 and 187 and 194 together with the triacs 177, 185 and 192 provides desirable transient protection with respect to the output to the solar system 19. For example, each triac may be selected to withstand a one cycle currentsurge of thirty (30) amps at sixty (60 Hz) hertz, for example, while the fuse may be selected to open circuit at about one (1) amp sustained for over one cycle which will occur before the particular triac is damaged. In such manner, the control is protected even if an active output is "dead shorted". Such construction permits wiring mistakes to be made during installation without experiencing permanent damage to the control.

The input opto-isolators 135, on the other hand, which function with the resistor-capacitor network 144 and diode 145, permit operation under inputs up to fifteen hundred (1500) volts RMS to maintain isolation of the logic circuit 133 from the sensor 58.

Certain of the sensing circuits are illustrated in FIG. 5. The collector sensor 89 is connected in a voltage dividing circuit including the regulated voltage circuit 129, a resistor 210, the sensing thermistor 89 and the system neutral 101. A junction 211 between resistor 210 and thermistor 89 is connected to an inverting input 212 of a voltage comparator 213 through an input resistor 214.

The fluid return sensor 90 is likewise connected in a voltage dividing circuit including the regulated voltage circuit 129, a resistor 215, a manually operated switch 216, a connecting resistor 217, the thermistor 90 and the system neutral 101. The switch 216 includes a switch arm 218 which is manually operable between a winter contact 219 for connection of the sensor 90 for control and a summer contact 220 for removal of the sensor 90 when it is no longer needed or desired. A junction 221 between resistor 215 and switch 216 is connected to a non-inverting input 222 of comparator 213 through a resistor 223. A coupling capacitor 224 is connected across inputs 212 and 222.

The impedance of the resistors within the input circuits to comparator 213 are preselected so that comparator 213 will turn on to provide a logic "1" signal at an output 225 whenever the temperature sensed by the collector thermistor 89 is greater by a predetermined magnitude than the temperature sensed by the fluid return sensor 90. In other words, a logic "1" signal at output 225 indicates that the fluid temperature in collector 20 exceeds the temperature of the fluid returning from either enclosure 11 or storage 50 by a predetermined amount, such as 45° F. for example. A logic "0" signal at output 225 indicates that the fluid temperature at collector 20 is less than the predetermined magnitude differential with respect to the temperature of the returning fluid from enclosure 11 or storage 50.

The output circuit 225 of comparator 213 is connected to a base circuit 226 of a PNP type transistor 227 through a voltage dividing circuit 228 including resistor 229 and resistor 230. The transistor 227 has an emitter circuit 231 connected to the regulated voltage circuit 129 and a collector circuit 232 connected to the inverting input 212 of comparator 213 through a resistor 233 and the input resistor 214. In operation, a logic "1" signal at output 225 in response to the turn on of comparator 213 renders the transistor 227 non-conductive to remove or decrease the signal to the inverting input 212 of comparator 213. As previously stated, comparator 213 initially requires a first predetermined magnitude differential between the temperature proportional input signals at terminals 212 and 222 in order to turn on. When once turned on, a lesser temperature variation or differential as sensed at sensors 89 and 90 is permitted to exist before comparator 213 turns off. Thus, comparator 213 requires a first differential, such as 45° F. for example, to turn on and a second lesser differential, such as 25° F. for example, to turn off.

As an illustrative example, if the returned fluid temperature in conduit 22 is at a first predetermined magnitude, such as 50° F. for example, the temperature in collector 20 must reach a second predetermined magnitude, such as 95° F. for example, in order for comparator 213 to turn on to supply a logic "1" signal at output 225. With comparator 213 on, transistor 227 is rendered non-conductive to remove or decrease the signal at input 212. If the temperature of the fluid in conduit 22 increases to a second magnitude, such as 60° F. for example, while comparator 213 is turned on, the temperature in collector 20 would be required to decrease to a second predetermined magnitude, such as 85° F. for example, before the comparator 213 would turn off.

A switch 234 includes a switch arm 235 connected to the neutral circuit 101 and is selectively operable to engage an open circuit winter contact 236 and a summer contact 237. The summer contact 237 is connected to a non-inverting input 238 of a voltage comparator 239 through a resistor 240. The non-inverting input 238 is also connected to the regulated voltage circuit 129 through a resistor 241. With switch 235 in engagement with summer contact 237, resistors 240 and 241 function as a voltage divider connected to the non-inverting input 238. An inverting input 242 of comparator 239 is connected to the system neutral 101 through a resistor 243 and to the regulated voltage circuit 129 through a resistor 244. An output circuit 245 of comparator 239 is connected to the junction 221 through a resistor 246 and a diode 247. With switch 234 open, the comparator 239 remains in a turned on condition to provide a logic "1" signal at output 245 to reverse bias the diode 247. In that switch 234 is coupled to switch 216 for simultaneous operation, the switch 234 will be open when switch 216 is closed to connect the return fluid sensor 90 to comparator 213 for operative control.

During warm weather or summer operation, switch 216 is opened to disconnect the return fluid sensor 90 from comparator 213 while switch 234 is closed to operatively connect resistor 240 into circuit operation with comparator 239. Thus with switch 234 closed, the comparator 239 turns off to provide a logic "0" signal at output 245 to render diode 247 conductive. In such manner, the resistor 246 is operatively connected in voltage divider relationship with resistor 215 to provide a predetermined magnitude signal at input 222 of comparator 213. Under such operation, the temperature of fluid in collector 20 must exceed by a predetermined amount the established pre-set temperature reference provided at input 222 in response to the operation of comparator 239. Thus in summer or warm weather operation, the fluid temperature in collector 20 as sensed by thermistor 89 must reach a pre-established or fixed temperature in order to turn on comparator 213 to provide a logic "1" signal at output 225 for indicating that the collector is capable of providing fluid of a significant temperature. As an example, the removal of sensor 90 and the operation of comparator 239 requires the temperature at the collector sensor 89 to reach a predetermined magnitude, such as 170° F. for example, to turn comparator 213 on and will remain turned on until the temperature at sensor 89 decreases to a second predetermined magnitude, such as 148° F. for example.

The storage sensor 91 is connected in a voltage divider circuit 249 including a resistor 250 connected with the thermistor 91 while a junction circuit 251 is connected to an inverting input 252 of a voltage comparator 253 through a resistor 254. Another voltage divider 255 includes resistors 255a and 255b serially connected between the regulated voltage circuit 129 and the system neutral 101 with a junction 256 connected to a non-inverting input 257 of comparator 253 through an input resistor 257a.

When fluid temperature within the storage 50, as sensed by thermistor 91, reaches or exceeds a predetermined magnitude, as established by the comparison of the signals at inputs 252 and 257, the comparator 253 turns on to provide a logic "1" signal at an output circuit 258 indicating that the storage 50 has sufficient heat capability to supply heat energy if needed. The output circuit 258 is connected to the input 257 through a feed back resistor 259 and the input resistor 257a. Thus when comparator 253 turns on to provide a logic "1" output, the reference voltage at input 257 likewise increases a predetermined amount. In such manner, the comparator 253 will continue to provide a logic "1" output with the fluid temperature in storage 50 decreases to a second predetermined magnitude. For example, the impedance of the elements connected to the inputs 252 and 257 are pre-established to require the storage fluid temperature to reach a first predetermined magnitude, such as 100° F. for example, in order to turn comparator 253 on and provide a logic "1" signal at output 258. When once on, the feedback provided by resistor 259 will permit comparator 253 to remain on until the storage fluid temperature decreases to a second predetermined magnitude, such as 90° F. for example, at which point comparator 253 turns off to establish a logic "0" signal at output 258.

In warm weather or summer time, the opening of switch 234 will turn comparator 239 off to provide a logic "0" signal at output 245. In such condition, resistor 255b is effectively shorted out by the conducting path including a diode 260 and the output 245 of comparator 239. With such operative condition, the fluid temperature in storage 50 must reach an exceptionally high temperature, such as 300° F. for example, before comparator 253 will turn on to provide a logic "1" output. In such manner, the comparator 253 and storage sensor 91 are removed in a practical sense from operative control during warm weather or in the summer time.

Figure 6:
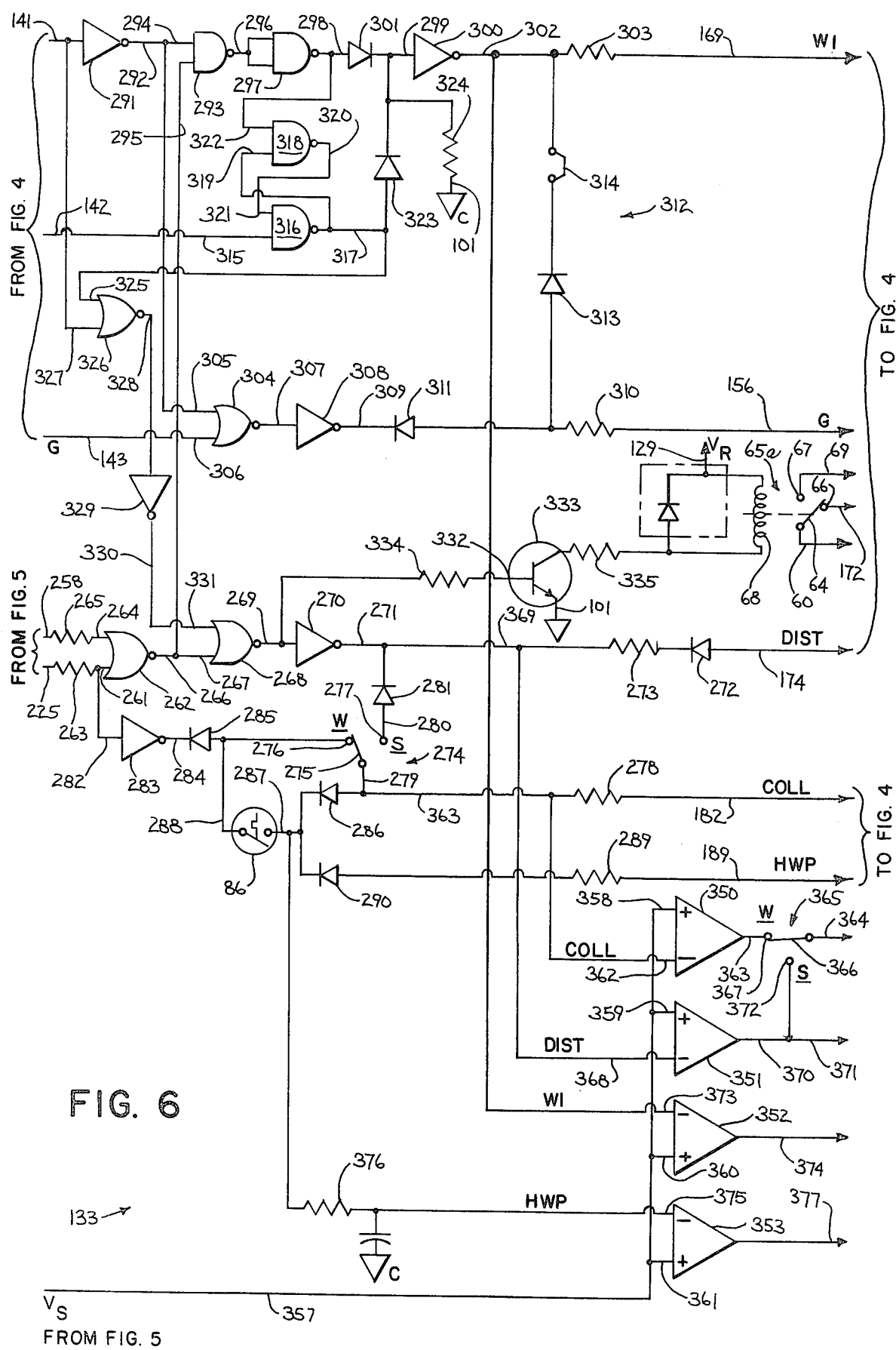
FIG. 6 is an electrical circuit schematic illustrating the logic circuits depicted in FIG. 4.

The logic circuits 133 are further illustrated in FIG. 6. The output 225 of comparator 213 is connected to an input 261 of a NOR circuit 262 through a resistor 263. In like manner, the output 258 of comparator 253 is connected to an input 264 of NOR 262 through a resistor 265. When fluid temperature in collector 20 and storage 50 is deficient or low in a winter operating sequence, logic "0" signals appear at inputs 261 and 264 and NOR 262 provides a logic "1" signal at an output 266. When either the collector 20 or storage 50 possess significant heat energy, one or both of the inputs 261 or 264 receives a logic "1" signal and NOR 262 will provide a logic "0" output indicating that the solar system 19 has sufficient capability to supply energy to the enclosure 11. In such case, the logic "0" signal at output 266 is applied to an input 267 of a NOR circuit 268. With logic "0" signals at both inputs, NOR 268 provides a logic "1" signal at an output 269 which is connected to an inverter 270 to provide a logic "0" signal at an output 271. With a logic "0" at output 271, a conducting circuit is established from the regulated voltage circuit 129 through the LED 175, connecting circuit 174 (see FIG. 4), a diode 272, a resistor 273 and the logic "0" at output 271 of inverter 270. The energization of LED 175 energizes triac 177 to provide a distribution signal DIST at the output circuit 117 as previously described to operate the distribution damper motor 48 and the solar blower motor 114 (FIG. 3). In such manner, the damper 45 is opened while damper 47 is closed and blower 49 is actuated to initiate a distribution sequence wherein fluid is withdrawn from collector 20 or storage 50 and passed to the enclosure 11.

In warm weather or summer operation, a switch 274 may be manually preset so that a switch arm 275 is removed from a winter contact 276 and engages a summer contact 277. In such condition, a logic "0" signal at the output 271 of inverter 270 provides a conducting path to energize the LED 183 and provide a collection signal COLL at output 104. Specifically, an energizing circuit is established from the regulated voltage circuit 129 through the LED 183, connecting circuit 182, a resistor 278, a connecting circuit 279, the switch arm 275, summer contact 277, a connecting circuit 280, a diode 281 and the logic "1" at output 271 of inverter 270. The collection signal COLL at output circuit 104 energizes the collector damper motor 42 and the solar blower motor 114. In such operation, the damper 39 is opened while damper 41 is closed, and blower 49 is activated to initiate a collection sequence wherein heated fluid is withdrawn from collector 20 and passed to the enclosure 11. In such manner, both a distribution sequence and a collection sequence is operative with switch arm 275 engaging the summer contact 277 to permit fluid to flow from the collector 20 to the enclosure 11 irrespective of the operation of the hot water sensor 86. With switch 275 removed from contact 276, the system is disabled from supplying fluid from the collector 20 to the storage 50 independent from the operation of the hot water sensor 86. In other words, a collection only sequence can operate with switch arm 275 engaging the summer contact 277 only through the operation of the hot water sensor 86. In summer operation, it is customary to remove the storage 50 from the fluid system by closing damper 52 and opening damper 54.

An input circuit 282 of an inverter 283 is connected to the output circuit 225 of comparator 213 through the resistor 263. The inverter 283 responds to a logic "1" at circuit 225 to provide a logic "0" signal at an output 284 indicating that heated fluid is available in collector 20 for use by the system. The output 284 of inverter 283 is connected to the winter contact 276 of switch 274 through a diode 285. With switch 274 in the winter position, i.e. switch arm 275 engaging contact 276, a logic "0" signal at output 284 of inverter 283 energizes the LED 183 through a conducting circuit including the regulated voltage circuit 129, LED 183, the connecting circuit 182, the resistor 278, switch arm 275, contact 276, diode 285 and the logic "0" at output 284 of inverter 283. With LED 183 energized, the triac 185 conducts to provide a collection signal COLL at the output circuit 104.

The triac 185 may also by energized to provide the collection signal COLL in response to the logic "0" signal provided by inverter 283 through an alternate conduction path including the sensor 86 located at the water tank 30. In this regard, closure of the bi-metal thermal switch of sensor 86 in response to a low temperature condition in tank 30 provides an energizing circuit from the regulated voltage circuit 129, LED 183, the connecting circuit 182, the resistor 278, a diode 286, a connecting circuit 287, the closed contacts of sensor 86, a connecting circuit 288, the diode 285 and the logic "0" output 284 of inverter 283. Thus if switch 274 is in the summer position (i.e. switch arm 275 engaging contact 277), a logic "0" at output 284 may operate to provide a collection signal COLL only through the hot water sensor 86.

The closure of the bi-metal thermal switch contacts of sensor 86 and the occurrence of a logic "0" signal at output 284 of inverter 283 further operates to energize the triac 192 to provide the hot water pump signal HWP at output 195 to energize the pump 31. In this regard, an energizing circuit is completed from the regulated voltage circuit 129 through the LED 190, connecting circuit 189, a resistor 289, a diode 290, the connecting circuit 287, the closed thermal switch contacts of sensor 86, the connecting circuit 288, the diode 285 and the logic "0" at output 284 of inverter 283.

A first stage heat signal W1 at input 60 operatively provides a logic "0" signal at connecting circuit 141, as previously described. An inverter 291 is connected to respond to the logic "0" at circuit 141 to provide a logic "1" signal at an output 292. A NAND circuit 293 has an input 294 connected to the output 292 of inverter 291 and another input 295 connected to the output 266 of NOR 262.

If there is insufficient heat energy in both the collector 20 and storage 50, the NOR 262 will respond to the logic "0" signals at inputs 261 and 264 to provide a logic "1" signal to input 295. The NAND 293 responds to logic "1" signals at both of its inputs 294 and 295 to provide a logic "0" signal at an output 296 indicating that first stage heat is required and that the solar system 19 is incapable of meeting the need. Both inputs of a NAND circuit 297 are connected to output 296 to invert the logic "0" input to provide a logic "1" signal at an output 298. An input circuit 299 of an inverter 300 is connected to the output 298 through a diode 301. An output circuit 302 of inverter 300 is connected to LED 170 through the connecting circuit 169 and a resistor 303. In operation, the inverter 300 responds to the logic "1" provided by NAND 297 to provide a logic "0" at output 302. In such manner, a conducting circuit is provided from the regulated voltage circuit 129 through the LED 170, the connecting circuit 169, the resistor 303 and the logic "0" at output 302 of inverter 300. The triac 77 is thereby energized to conduct the first stage heat signal W1 from the thermostat 58 to the auxiliary heat system 12 for conducting heat from the auxiliary heat system 12 to the enclosure 11.

If the solar system has sufficient heat capability, the NOR 262 will supply a disabling logic "0" signal to input 295 of NAND 293. In such manner, a logic "1" at output 296 of NAND 293 is maintained irrespective of the existence of a first stage heat signal at input 60. The triac 77 thus remains non-conductive with the solar heat system 19 being relied upon to service any demand for heat energy rather than the auxiliary heat system 12.

A NOR circuit 304 has an input 305 connected to the output 292 of the inverter 291 while another input 306 is connected to the connecting circuit 143. With a fan signal G at input 63, a logic "0" signal appears at connecting circuit 143 and thus at input 306. If first stage heat is not required, a logic "0" appears at input 305 and NOR 304 will provide a logic "1" at an output circuit 307. An inverter 308 responds to the logic "1" provided by NOR 304 and provides a logic "0" signal at an output 309. In such manner, an energizing circuit is provided from the regulated voltage circuit 129 through the LED 157, the connecting circuit 156, a resistor 310, a diode 311 and the logic "0" at output 309 of inverter 308. The triac 85 is energized to conduct the fan signal G from the thermostat 58 to the auxiliary heat system 12 for fan operation.

If first stage heat is called for (i.e. a W1 signal at input 60), inverter 291 will supply a logic "1" signal to input 305 of NOR 304. In such manner, NOR 304 will maintain a logic "0" at output 307 to disable the triac 85 and prevent the conducting of the fan signal G through output 84.

An optional circuit 312 includes a diode 313 serially connected with a removable jumper 314 which interconnects the output 302 of inverter 300 to the connecting circuit 156 through the resistor 310. In situations where the auxiliary heat system 12 includes a reversible heat pump, it may desired to connect jumper 314 into circuit so that inverter 300 will energize both the LED 170 and LED 157 to simultaneously conduct the first stage heat signal W1 through output 76 and the fan signal G through output 84. In other operations, jumper 314 would be removed (open circuited).

The existence of either a second stage heat signal W2 at input 61 or an air conditioning signal O/Y at input 62 will provide a logic "0" signal at the connecting circuit 142. Such signal is supplied to an input 315 of a NAND circuit 316. The NAND 316 responds to the logic "0" signal at input 315 to provide a logic "1" signal at an output 317. The NAND 316 is connected in flip flop configuration with a NAND 318. Thus, output 317 of NAND 316 is connected to an input 319 of NAND 318. Likewise, an output 320 of NAND 318 is connected to an input 321 of NAND 316. Another input 322 of NAND 318 is connected to the output 298 of NAND 297. The output 317 of NAND 316 is connected to input 299 of inverter 300 through a diode 323. The diode 323 is also connected to the system neutral or ground 101 through a resistor 324.

The inverter 300 responds to the logic "1" at output 317 and provides a logic "0" at output 302 to provide a gating signal to the triac 77. If a first stage heat signal W1 simultaneously appears at input 60, triac 77 will conduct the first stage heat signal W1 to the auxiliary heat system 12 through connecting circuit 76 irrespective of the capability of the solar system 19 to provide heat energy. In other words, the existence of a disabling logic "0" at input 295 of NAND 293 which indicates that the solar system 19 has sufficient heat capabilities will fail to disable the first stage heat sequence because of the over-ride provided to inverter 300 by NAND 316 in response to the existence of either a second stage heat signal W2 or an air conditioning signal O/Y.

The logic "1" over-ride signal at output 317 of NAND 316 is also supplied to an input 325 of a NOR circuit 326. An input 327 of NOR 326 is connected to the connecting circuit 141. An output circuit 328 of NOR 326 is connected to an inverter 329 which, in turn, provides an output 330 connected to an input 331 of the NOR circuit 268.

The NOR 326 responds to the over-ride logic "1" signal provided by NAND 316 to provide a logic "0" signal to inverter 329 which, in turn, provides a disabling logic "1" signal to input 331 of NOR 268. Thus the occurrence of either a second stage heat signal W2 at input 61 or an air conditioning signal O/Y at input 62 will disable NOR 268 thereby rendering the inverter 270 incapable of operatively providing either a distribution signal DIST or a collection signal COLL (i.e. switch arm 275 engaging contact 277).

The absence of a first stage heat signal W1 at input 60 will cause the connecting circuit 141 to maintain a logic "1" signal which is applied to input 327 of NOR 326. The NOR 326 responds to the logic "1" at input 327 and provides a logic "0" disable signal to inverter 329 which, in turn, provides a logic "1" disable signal to input 331 of NOR 268. As previously explained, NOR 268 responds to provide a disabling logic "0" signal to disable the inverter 270 and prevent its control of the distribution signal DIST and the collection signal COLL.

While the NOR 326 disables the inverter 270 in response to a second stage heat signal W2 or an air conditioning signal O/Y or the absence of a first stage heat signal W1, the inverter 283 remains operative to selectively provide a collection signal COLL and/or a hot water pump signal HWP under appropriate sensed conditions irrespective of any control provided by thermostat 58.

The occurrence of a first stage heat signal W1 at input 60 will cause a logic "0" signal to be applied to input 327 of NOR 326. In the absence of a second stage heat signal W2 and an air conditioning signal O/Y, NAND 316 will provide a logic "0" signal to input 325 and NOR 326 will provide an enabling logic "1" signal at output 328. The inverter 329 responds to the logic "1" input and provides an enabling logic "0" signal to input 331 of NOR 268. Such sequence enables the NOR 268 to provide a distribution mode operating sequence if the solar system has significant heat energy available.

An alternate impedance for the heat anticipator circuit provided by thermostat 58 is selectively connected in response to the distribution mode of operation provided by the solar system 19. If operating in a distribution mode, a logic "1" signal appears at output 269 of NOR 268. The output 269 is connected to a base circuit 332 of an NPN type transistor 333 through a connecting resistor 334. Such logic "1" input renders the transistor 333 conductive to energize the relay coil 68 through an energizing circuit path including the regulated voltage circuit 129, the coil 68 of relay 65a, a resistor 335, the conducting transistor 333 and the common or neutral 101.

The energization of relay coil 68 operatively transfers the switch arm 64 from contact 66 to engage contact 67. In such manner, an impedance circuit 336 (FIG. 4) is connected in circuit with the W1 input 60 to provide an alternate load generally corresponding to the impedance of a relay within the auxiliary heat system 12 which is actuated by the W1 input through the connecting circuit 76 if otherwise operating in an auxiliary heat mode. The impedance circuit 336 includes a variable resistor 337 having a variable tap 338 serially connected to a resistor 339. With switch arm 64 engaging contact 67, a circuit path exists from input 60 through arm 64 of switch 65a, contact 67, connecting circuit 69, resistor 337 and tap 338, resistor 339, and the common or ground 149. The variable tap 338 of resistor 337 is selectively adjusted to pre-set the impedance of circuit 336 to provide an impedance match by the control 65 which corresponds to the impedance of the W1 relay located within the auxiliary heat system 12.

Thus, with the solar system operating in a distribution mode, the alternate load provided by impedance 336 is selectively connected to the connecting circuit 60 (i.e. switch arm 64 engaging contact 67 of switch 65a). In that the W1 relay at the auxiliary heat system 12 is not operatively connected to the thermostat 58 during a distribution mode because of the non-conduction of triac 77, such added alternate impedance is desirable to provide corresponding operation of the anticipator circuit within the thermostat 58 in the same range as would otherwise be provided if the auxiliary heat system were connected in circuit. The impedance of variable resistor 337 is selectively adjusted so that the lead time or shut off advance provided by the anticipator circuit within thermostat 58 will be substantially the same for either a distribution sequence in a solar mode or an auxiliary sequence in an auxiliary heat mode.

A signalling circuit includes several driver circuits (FIG. 6) which are interconnected to selectively energize several light sources within the mode indicator 94 (FIG. 7). With reference to FIG. 6, a series of operational amplifiers 350, 351, 352 and 353 are connected to certain circuits within the control 65 for providing an indication of mode operation. A voltage reference for such operational amplifiers is provided by a voltage divider network 354 (FIG. 5) connected between the regulated voltage circuit 129 and the neutral 101 and including a pair of resistors 355 and 356 inter-connected through an output circuit 357. The voltage reference circuit 357 is connected to a non-inverting input 358 of amplifier 350, a non-inverting input 359 of amplifier 351, a non-inverting input 360 of amplifier 352, and a non-inverting input 361 of amplifier 353.

An inverting input 362 of amplifier 350 is connected to a connecting circuit 363 which joins resistor 278 to the diode 286 and the switch arm 275 of switch 274. When a logic "0" signal appears at connecting circuit 363 for providing a collection signal COLL at output 104, the amplifier 350 turns on to provide a logic "1" signal at an output circuit 363. The output circuit 363 may be connected to supply the logic "1" output to a connecting circuit 364 through a manually actuated switch 365. Specifically, a connecting circuit is completed when a switch arm 366 of switch 365 engages a winter contact 367 thereby completing a circuit from the output 363 to the connecting circuit 364.

An inverting input 368 of amplifier 351 is connected to a connecting circuit 369 joining the resistor 273 and the output 271 of inverter 270. When a logic "0" appears at connecting circuit 369 to provide a distribution signal DIST at output 117, the amplifier 351 turns on to provide a logic "1" signal at an output 370. Such signal is supplied to a connecting circuit 371. When switch arm 366 of switch 365 is transferred to engage a summer contact 372, the output 370 of amplifier 351 is also connected to circuit 364.

An inverting input 373 of amplifier 352 is connected to the output 302 of inverter 300. When output 302 provides a logic "0" signal to provide conduction of a first stage heat signal W1 through output 76, the amplifier 352 turns on to provide a logic "1" signal at an output connecting circuit 374.

An inverting input 375 of amplifier 353 is connected through a resistor 376 to the connecting circuit 287 associated with the hot water sensor 86. When the bimetal contacts of sensor 86 close and a logic "0" signal appears at output 284 of inverter 283, the amplifier 353 turns on and provides a logic "1" signal at a connecting circuit 377.

With control 65 in a quiescent condition wherein the auxiliary heat system 12, the solar heat system 19 and the hot water system 29 are not operating, a logic "0" signal at connecting circuit 364 is connected to an anode of an LED 378 and a cathode of an LED 379 through a connecting resistor 380. A logic "0" signal at circuit 371 is connected to the cathode of LED 378 and the anode of LED 379 through a connecting resistor 381. Under such conditions, LED 378 and LED 379 are de-energized. The connecting circuit 364 is also connected to a base circuit 382 of an NPN type transistor 383 through a connecting resistor 384. A collector circuit 385 of transistor 383 is connected to the input circuit 371 while an emitter circuit 386 is connected to an anode circuit of an LED 387. With logic "0" signals at the connecting circuits 364 and 371, transistor 383 remains turned off so that the emitter circuit 386 will provide a logic "0" signal to the LED 387. A cathode circuit of LED 387 is connected to the input circuit 374 through a connecting resistor 388. Thus with a logic "0" signal at both the connecting circuit 374 and the emitter circuit 386, the LED 387 will remain deenergized. A LED 389 has an anode circuit connected to the connecting circuit 374 through a resistor 390 and a cathode circuit connected to the connecting circuit 371. Thus with the connecting circuit 371 at a logic "0" and connecting circuit 374 at a logic "0", the LED will remain de-energized. A LED 391 has an anode circuit connected to the connecting circuit 377 through a resistor 392 and a cathode circuit connected to the common or system neutral 101. With a logic "0" signal at connecting circuit 377, the LED 391 will remain de-energized. An LED 393 has an anode circuit connected to the connecting circuit 120 through a diode 394 and a resistor 395 and a cathode circuit connected to the system neutral 101. A diode 396 interconnects the diode 394 and the system neutral 101 for isolation and stabilization. With the contacts of the freeze sensor 92 open and the freeze relay 109 de-energized, a logic "0" signal will exist at connecting circuit 120 and LED 393 will remain de-energized.

The operation of the solar system in a collection mode only provides a collection signal COLL at the connecting circuit 104 to operatively energize the collection damper motor 42 to open damper 39 and close damper 41. Under such operation, heated fluid from collector 20 is supplied to the storage 50. The operational amplifier 350 turns on to provide a logic "1" at the connecting circuit 364 during a winter sequence with switch arm 366 engaging contact 367. In that the solar system is not operating in a distribution mode, the amplifier 351 remains off and a logic "0" signal remains at connecting circuit 371. Thus when operating under a collection mode only, a conducting circuit exists through LED 378 to provide a light signal indicating that the collector 20 is supplying heated fluid to storage 50.

When the solar system is operating in a distribution mode only, a distribution signal DIST occurs at connecting circuit 117 to operatively energize the distribution damper motor 48 to open damper 45 and close damper 47. In that the solar system is not operating in a collection mode, the damper 41 will remain open and heated fluid from storage 50 is supplied to the enclosure 11. Under such operation, the operational amplifier 351 turns on to supply a logic "1" signal at connecting circuit 371 while the operational amplifier 350 remains off to provide a logic "0" signal at connecting circuit 364. Under such conditions, an energizing circuit is completed for LED 379 which is energized to provide a light signal indicating that fluid is being transferred from the storage 50 to the enclosure 11.

When the solar system is operating in both the collection and distribution modes, both the collection and distribution damper motors 42 and 48 are energized to open dampers 39 and 45 while closing dampers 41 and 47 to transfer heated fluid from collector 20 to enclosure 11. In such situation, both of the amplifiers 350 and 351 turn on to supply logic "1" signals at the connecting circuits 364 and 371. The transistor 383 is rendered conductive to complete an energizing circuit to LED 387 which becomes energized to provide a light signal indicating that heat energy is being supplied from the collector 20 to the enclosure 11. Note that both of the LEDs 378 and 379 remain de-energized.

When the solar system is incapable of supplying heat energy, the system operates to conduct the W1 signal from the thermostat 58 to the auxiliary heating system 12. In such operation, the operational amplifier 352 turns on to provide a logic "1" signal to complete an energizing circuit to LED 389 to provide a light signal indicating that the auxiliary heating system 12 is operational.

When hot water is required to be supplied to the hot water tank 30 and sufficient energy exists within collector 20, the system will provide a hot water pump signal HWP at connecting circuit 195 to energize the water pump 31. Under such operation, the amplifier 353 will turn on to provide a logic "1" at connecting circuit 377 to provide a conducting circuit through LED 391 which becomes energized to provide a light signal indicating that the hot water pump 31 is energized.

When a freezing condition is sensed at transducer 28 by the sensor 92, the connecting circuit 120 is energized to complete a circuit to LED 393 which becomes energized to provide a light signal indicating a freeze condition. At the same time, energy is supplied to connecting circuit 195 to provide a hot water pump signal HWP to energize pump 31 in response to the sensed freeze condition at transducer 28. As previously described, the operation of the sensor 92 in response to an abnormal condition, such as an extremely low temperature, operatively de-energizes the damper motors 42 and 48 and the blower motor 114 to operatively de-activate the solar heating system independently from the control provided by the logic circuits 133. Thus with the solar heating system 19 operatively de-activated, the thermostat 58 will eventually issue a second stage heat signal W2 if operating in a cold environment to operate the auxiliary heat system 12 irrespective of the temperature capability of the solar system 19.

The invention provides numerous unique constructions and sequences of operation which ensure reliable operation to provide numerous operating modes under numerous sensed operating conditions.

Various modes of carrying out the invention are contemplated as being within the scope of the following claims particularly pointing out and distinctly claiming the subject matter which is regarded as the invention.

I claim:

1. A control to operate a solar heating system and an auxiliary heating system to selectively supply heat to an enclosure in response to the operation of a thermostat having a first output circuit selectively providing a first stage heat signal and a second output circuit selectively providing a fan signal, said control comprising means sensing the temperature of the solar heating system to provide a temperature indicative signal, a first gatable semiconductor having a first circuit connected to said first output circuit through first switch means including a first manually operable switch and a second circuit connected to the auxiliary heat system through a first current limiting resistor and a first fuse, a second gatable semiconductor having a first circuit connected to said second output circuit through second switch means including a second manually operable switch and a second circuit connected to the auxiliary heat system through a second current limiting resistor and a second fuse, and transfer means operatively connected to said temperature sensing means and to first and second gate inputs of said first and second semiconductors, respectively, to selectively render said first and second semiconductors conductive in response to said temperature signal of a predetermined magnitude to conduct the first stage heat signal and the fan signal from the thermostat to the auxiliary heat system to operate the auxiliary heat system.

2. The control of claim 1, and including by-pass means connected to said first and second manual switches, said first and second manual switches operable between a first condition to permit said first and second semiconductors to selectively conduct the first stage heat and fan signals to the auxiliary heat system and a second condition to connect said by-pass means in circuit to conduct the first stage heat and fan signals from the thermostat to the auxiliary heat system irrespective of the condition of said transfer means.

3. The control of claim 1, wherein the thermostat provides third and fourth output circuits directly connected to the auxiliary heating system to selectively provide a second stage heat signal and an air conditioning signal, respectively, said control including input means connected to monitor the first, second, third and fourth output circuits from the thermostat and an output to selectively control the operation of the solar heating system in response to the first stage heat signal, the second stage heat signal, the air conditioning signal and the fan signal.

* * * * *